(12) United States Patent
Tedder et al.

(10) Patent No.: US 10,101,119 B2
(45) Date of Patent: Oct. 16, 2018

(54) HOLSTER DOCK

(71) Applicant: Tedder Industries, LLC, Post Falls, ID (US)

(72) Inventors: Thomas Tedder, Post Falls, ID (US); Timothy Treto, Mead, WA (US); Jacob Shearer, Post Falls, ID (US)

(73) Assignee: TEDDER INDUSTRIES, LLC, Post Falls, ID (US)

( * ) Notice: Subject to any disclaimer, the term of this patent is extended or adjusted under 35 U.S.C. 154(b) by 5 days.

(21) Appl. No.: 15/642,629

(22) Filed: Jul. 6, 2017

(65) Prior Publication Data

US 2018/0010883 A1     Jan. 11, 2018

Related U.S. Application Data

(60) Provisional application No. 62/359,115, filed on Jul. 6, 2016.

(51) Int. Cl.
    *F41C 33/02*     (2006.01)
    *F41C 33/04*     (2006.01)
    *F41C 33/00*     (2006.01)

(52) U.S. Cl.
    CPC .......... *F41C 33/02* (2013.01); *F41C 33/0263* (2013.01); *F41C 33/041* (2013.01); *F41C 33/00* (2013.01)

(58) Field of Classification Search
    CPC .. A45F 2200/0591; A45F 5/021; F41A 23/18; F41C 33/041; F41C 33/045; F41C 33/006; B60R 7/14

USPC ........ 224/547, 550, 551, 555, 557, 667, 195
See application file for complete search history.

(56) References Cited

U.S. PATENT DOCUMENTS

| | | | | |
|---|---|---|---|---|
| 4,256,245 A | * | 3/1981 | Serres | F41A 17/02 220/481 |
| 4,466,148 A | * | 8/1984 | Jones | A47C 21/00 108/55.1 |
| 7,950,554 B2 | * | 5/2011 | Hoffner | A45F 5/02 224/222 |
| 2008/0230663 A1 | * | 9/2008 | Svehlek | E06C 7/48 248/211 |
| 2017/0160050 A1 | * | 6/2017 | Alfaro | F41C 33/008 |

* cited by examiner

*Primary Examiner* — Adam Waggenspack
(74) *Attorney, Agent, or Firm* — Timberline Patent Law Group

(57) ABSTRACT

Representative implementations of devices and techniques provide a mounting dock to receive and to support an implement (such as a handgun, for example) or an implement holster (such as a handgun holster, for example). The dock includes a substantially planar mount portion having two substantially planar surfaces opposite to each other and a plurality of side edges. The substantially planar mount portion includes an entry edge on a first side edge and a grip portion on a second side edge. The dock includes at least one hard mount base configured to temporarily or permanently couple the hard mount component to a selected surface in a variety of configurations.

15 Claims, 11 Drawing Sheets

HOLSTER DOCK

PRIORITY CLAIM AND CROSS-REFERENCE TO RELATED APPLICATION

This application claims the benefit under 35 U.S.C. § 119(e)(1) of U.S. Provisional Application No. 62/359,115, filed Jul. 6, 2016, which is hereby incorporated by reference in its entirety.

BACKGROUND

Implements, such as tools, weapons, and the like, may be encased in a holster for protection of the implement and/or the user, while providing access to the implement. For example, a holster may allow a user to conveniently carry the implement, safely retaining the implement until needed. When the implement is to be used, the user may withdraw the implement from the holster, and then return it to the holster when finished. In some cases, such as with a handgun for example, the holster may allow the user to conceal the implement, or to conceal the fact that the user is carrying the implement.

However, it may not be desirable for the user to wear the implement and holster at all times. For example, it may be desirable to move the implement and holster from a worn position on the user to a temporary location not on the user's person for a time (such as when driving an automobile, sitting at a desk, sleeping in a bed, etc.), and still have ready and convenient access to the implement.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations of the figures are for example, and other shapes and or dimensions may be used and remain within the scope of the disclosure, unless specified otherwise.

FIG. 1A shows a perspective view of the holster dock in a first configuration. FIG. 1B is an exploded view of the holster dock, according to the first configuration.

FIG. 2A shows a top view, FIG. 2B shows a front perspective view, and FIG. 2C shows a front view.

FIG. 3A illustrates a back perspective view and FIG. 3B illustrates an exploded view from the back.

FIG. 4A shows a bottom view, FIG. 4B shows a back perspective view, and FIG. 4C shows a back view.

FIG. 5A shows aligning the holster to the dock, and FIG. 5B shows the holster mounted to the dock.

FIG. 6A shows aligning the holster to the dock, and FIG. 6B shows the holster mounted to the dock.

FIG. 7A shows the holster dock in a second configuration. FIG. 7B shows an exploded view of the holster dock, according to the second configuration.

FIG. 8A shows aligning the holster to the dock, and FIG. 8B shows the holster mounted to the dock.

FIG. 9A shows aligning the holster to the dock, and FIG. 9B shows the holster mounted to the dock.

FIGS. 10A and 10B show the holster dock from the shell side. FIG. 10C is a profile view of the holster dock, showing the top of the dock.

FIG. 11A is a perspective view, and FIGS. 11B and 11C include a top view and a side view, respectively.

DETAILED DESCRIPTION

Introduction

Figure 1A:
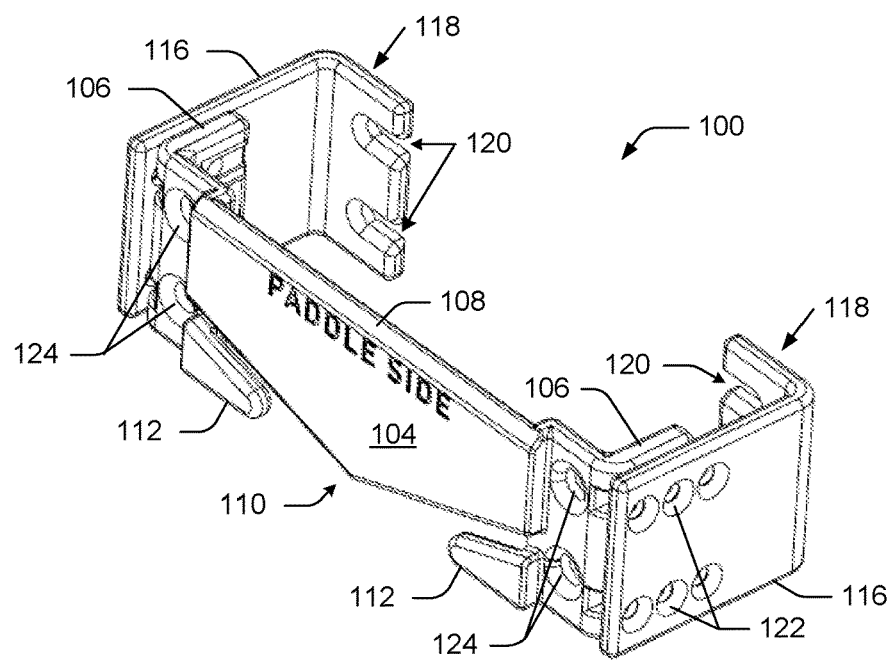
FIGS. 1A and 1B show two views of an example holster dock, according to an implementation.
Figure 1B:
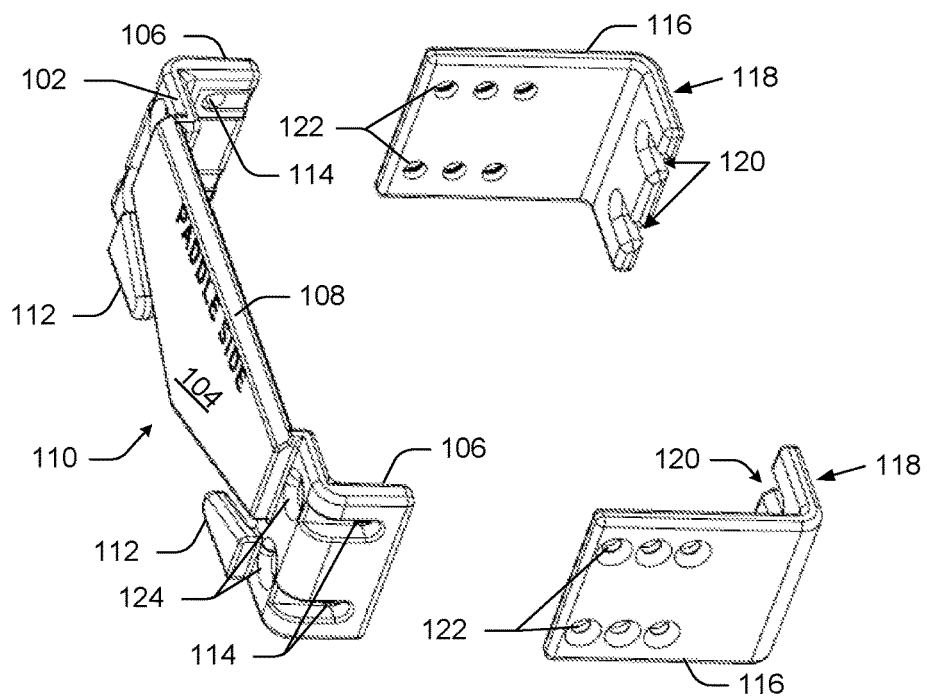
Figure 2A:
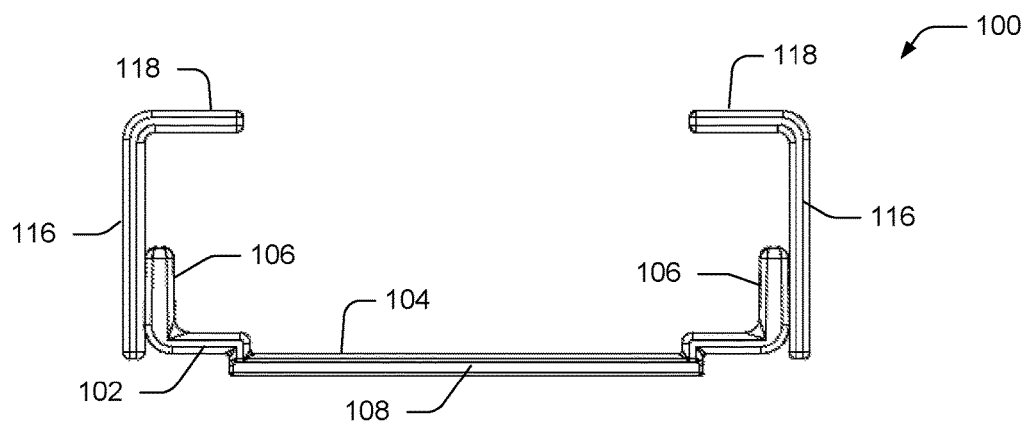
FIGS. 2A-2C include three views of an example holster dock, in the first configuration.
Figure 2B:
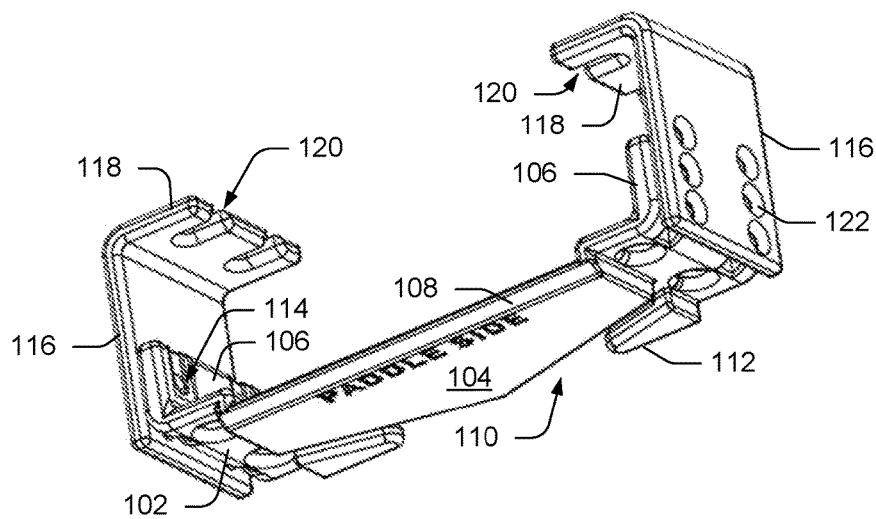
Figure 2C:
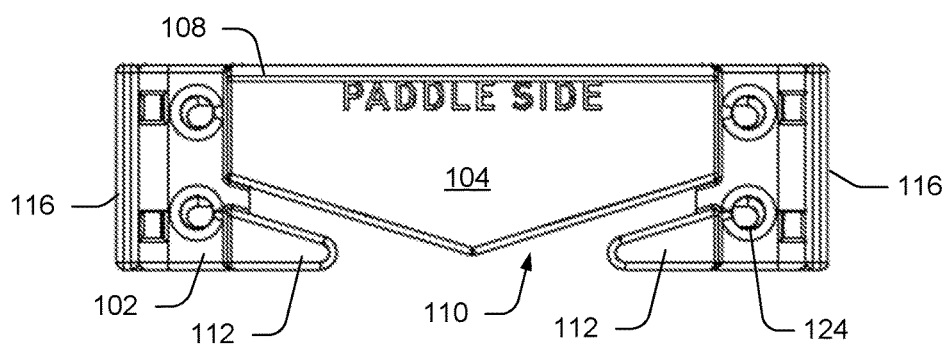
Figure 3A:
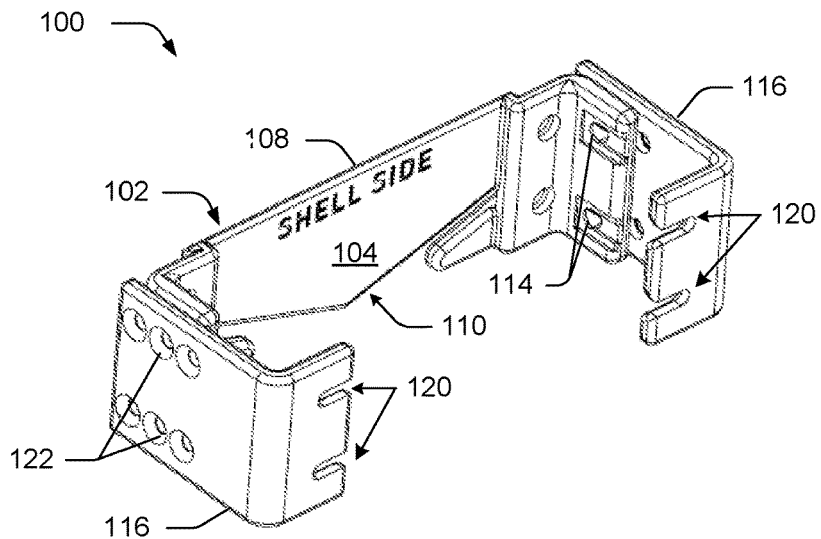
FIGS. 3A and 3B show two views of an example holster dock in the first configuration.
Figure 3B:
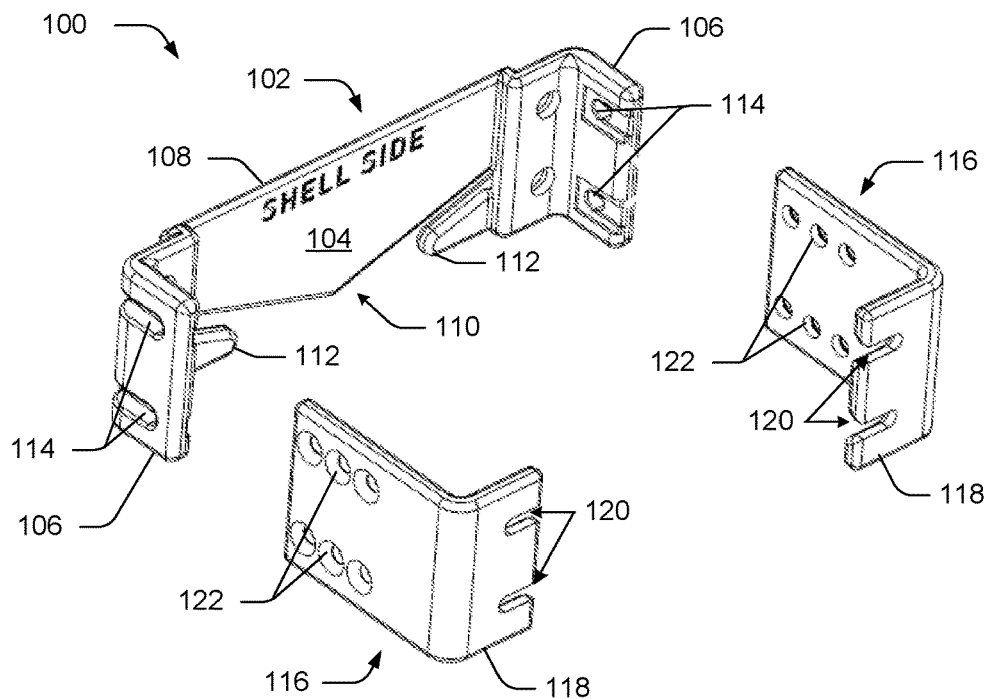
Figure 4A:
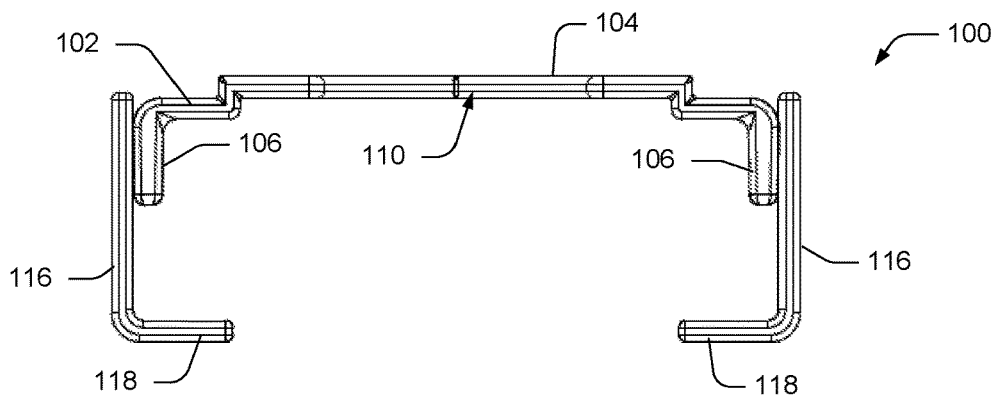
FIGS. 4A-4C include three views of an example holster dock in the first configuration.
Figure 4B:
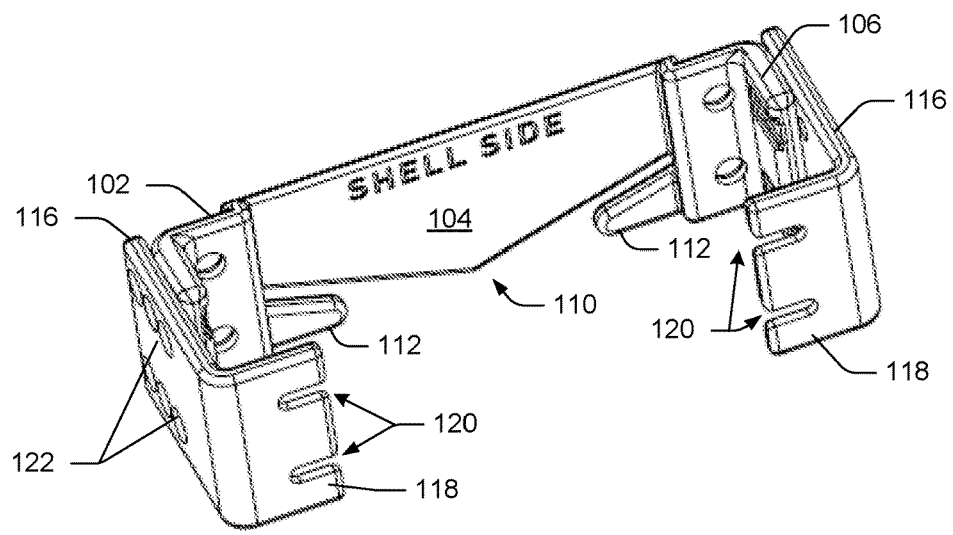
Figure 4C:
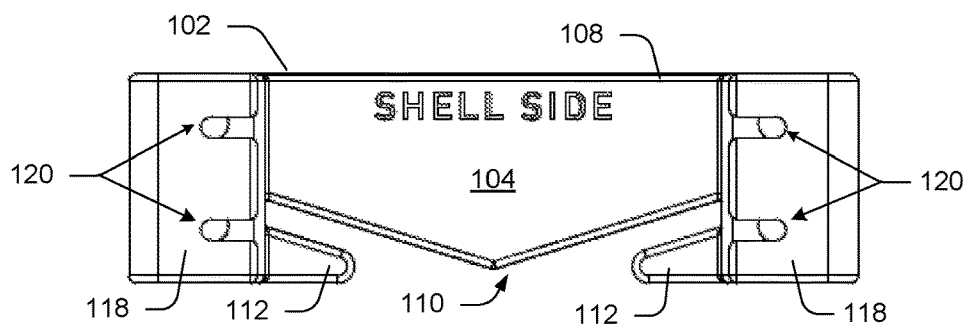

Representative implementations of devices and techniques provide a mounting dock to receive and to support an implement (such as a handgun, for example) or an implement holster (such as a handgun holster, for example). The dock is arranged to be mounted in various locations for temporarily and safely stowing the implement, while making the implement easily accessible to the user. For example, the dock may be mounted to a convenient surface, such as within a vehicle, on a portion of a desk or other furniture, on a bedframe, or the like, either within view or concealed from view. The dock may be removed from one location and mounted to another location if desired, or multiple docks may be used in various locations by a user.

In various implementations, the user can remove the implement or implement holster from their person, and mount the implement or implement holster to the dock for temporary storage with easy access. For example, when preparing to use a vehicle, the user may remove a holster from a location on the user's person, and mount the holster to the dock located inside the vehicle. The dock may be coupled to the vehicle in a convenient location, within easy reach of the user while in the vehicle. The user can easily and quickly dismount the implement or implement holster from the dock and place it on their person when desired (such as when leaving the vehicle). Alternately, the user can withdraw the implement from the holster for use while the holster remains mounted to the dock. The implement may be returned to the holster while the holster is mounted to the dock.

Techniques and devices are discussed with reference to example handgun holsters illustrated in the figures. However, this is not intended to be limiting, and is for ease of discussion and illustrative convenience. The techniques and devices discussed may be applied to a holster or to any of various cases, case designs, combinations, and the like, (e.g., holsters, sheaths, covers, cases, carriers, scabbards, etc.) for encasing tools, weapons, or other implements, and remain within the scope of the disclosure.

Further, the techniques and devices are discussed and illustrated generally with reference to an outside waistband (OWB) style holster. This is also not intended to be limiting. In various implementations, the techniques and devices may be employed with inside waistband (IWB) holsters, outside waistband (OWB) holsters, as well as holsters or cases that may be worn in various ways using a belt, strap, or other article. In alternate implementations, the techniques and devices may be employed in other ways or with other devices, systems, instruments, or the like.

Implementations are explained in more detail below using a plurality of examples. Although various implementations and examples are discussed here and below, further implementations and examples may be possible by combining the features and elements of individual implementations and examples.

Example Holster Dock

As shown in FIGS. 1A-11C, the holster dock 100 may be used with a paddle-type holster for a handgun. This allows the paddle portion of the holster to be clipped onto a receiving portion 110 of the dock 100, until removed. The illustrations are not intended to be limiting however, and the dock 100 may be used with various other types of holsters, as well as with other implements. For this disclosure, the use of the term "holster" also applies to various implements without a holster. Further, the shape of the dock 100 may vary to accommodate various implements and/or holsters.

An example dock 100, as shown in FIGS. 1A-9B, includes a hard mount component 102 arranged to receive and to support an implement or an implement holster, which includes a substantially planar mount portion 104 and a pair of mounting ears 106. In an implementation, the mount portion 104 has two substantially planar surfaces ("shell side" and "paddle side") and a plurality of side edges (e.g., edges), including a beveled entry edge 108 on a first side edge and a figured paddle grip portion 110 on a second side edge opposite the first side edge. In one example, the paddle grip portion 110 has one or more grip features 112 arranged to grip a paddle or a clip of the implement or of the implement holster, to add stability while the holster is mounted to the dock 100.

Mounting ears 106 are coupled or integral to a third side edge and a fourth side edge of the mount portion 104, and each mounting ear 106 has one or more mounting holes 114 (which are used with adjustment holes 122 to mount the hard mount bases 116 to the hard mount component 102).

In an implementation, the dock 100 also includes two hard mount bases 116 configured to couple the hard mount component 102 to a selected surface. For instance, the bases 116 each include a surface mount portion 118 having one or more surface mount openings 120 for temporarily or permanently coupling the mounting dock 100 to the desired surface (e.g., vehicle console, desk, bed, etc.) using permanent or temporary fasteners as desired.

The bases 116 are coupled to the hard mount component 102 via the mounting ears 106. The bases 116 are coupled to the mounting ears 106 using fasteners within one or more of the adjustment holes 122, which also allow the bases 116 to be adjusted with respect to the mount portion 104. For example, a distance from the mount portion 104 to the surface mount portions 118 of the bases 116 is adjustable based on selecting one or more of the plurality of adjustment holes 122 for coupling the hard mount component 102 to the first and second hard mount bases 116.

The plurality of adjustment holes 122 are disposed at a plurality of adjustment locations for coupling the first and second hard mount bases 116 to the hard mount component 102 in a plurality of desired configurations. A configuration of the mounting dock 100 is adjustable based on coupling the hard mount component 102 to the first and second hard mount bases 116 as desired. FIGS. 1A-6B show the dock 100 in a first configuration, with a first surface (i.e., the "shell side") of the mount portion 104 facing the surface mount portions 118. FIGS. 7A-9B show the dock 100 in a second configuration, with the first surface (i.e., the "shell side") of the mount portion 104 facing away from the surface mount portions 118 (which means the "paddle side" of the mount portion 104 faces the surface mount portions 118).

A user may select the first or second configurations (or another configuration) as desired based on the chosen mounting location for the dock 100, including the convenience of mounting the holster or implement to the dock 100. For example, the adjustment holes 122 of the bases 116 are positioned such that the bases 116 can be attached to the hard mount component 102 in the first configuration (i.e., a first orientation), with the surface mount portions 118 facing the "shell side" of the mount portion 104, or the bases 116 can be rotated 180 degrees and can be attached to the hard mount component 102 in the second configuration (i.e., a second orientation), with the surface mount portions 118 facing the "paddle side" of the mount portion 104.

Illustrations of FIGS. 1A-9B show the hard mount bases 116 coupled to the hard mount component 102 so that the surface mount portions 118 are oriented inward toward each other, or toward the center of the mount portion 104. This is not intended to be limiting. The bases 116 can also be coupled to the hard mount component 102 (via the mounting ears 106) so that the surface mount portions 118 are oriented outward away from each other, or away from the center of the mount portion 104. This allows convenience in mounting the dock 100 to the desired mounting surface.

Additionally, while in either the first or second configurations, the distance from the mount portion 104 to the surface mount portions 118 (and thus the mounting surface) is adjustable based on selecting one or more of the plurality of adjustment holes 122 for coupling the hard mount component 102 to the first and second hard mount bases 116 (via mounting holes 114 of the ears 106).

In an implementation, the hard mount component 102 may also include access holes 124, which may be used to provide access to fasteners or for tools for coupling the dock to a desired surface via surface mount openings 120. For instance, a user may tighten a fastener in a surface mount opening 120 by inserting a screwdriver through an access hole 124.

Figure 5A:
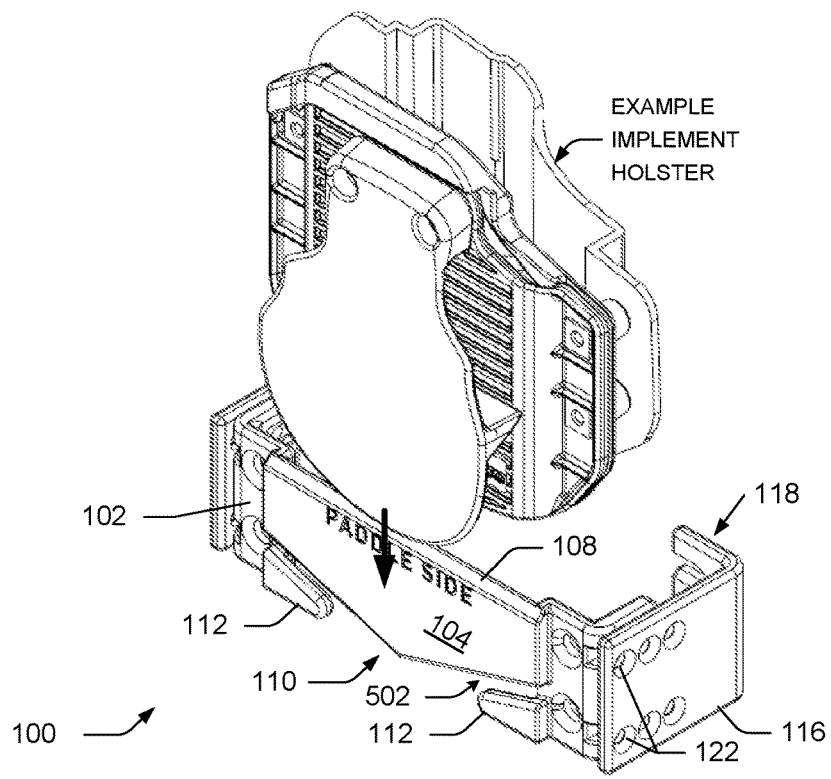
FIGS. 5A and 5B show two front views of an example holster dock in the first configuration, with an example implement holster being mounted to the dock.
Figure 5B:
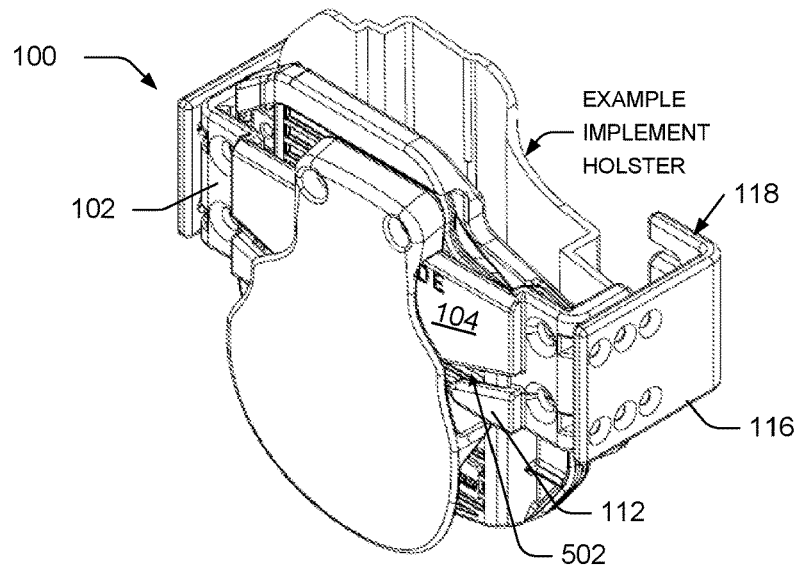
Figure 6A:
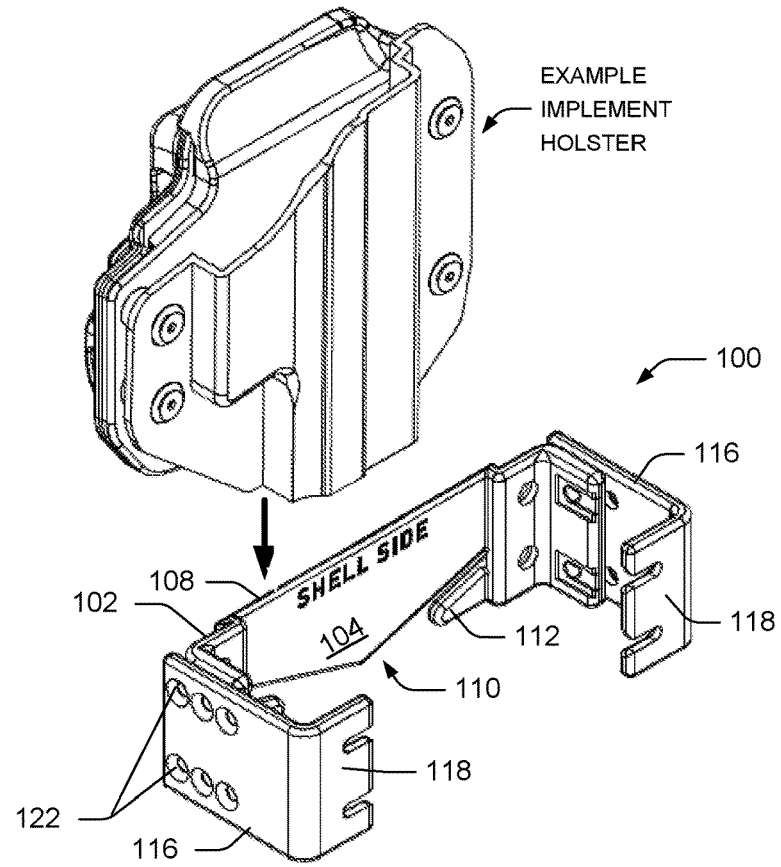
FIGS. 6A and 6B show two back views of an example holster dock in the first configuration, showing an example holster mounted to the dock.
Figure 6B:
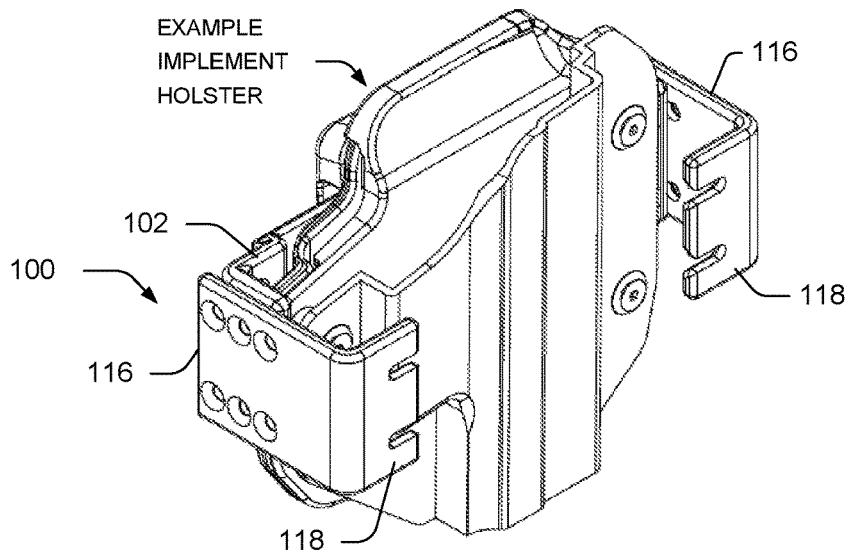
Figure 7A:
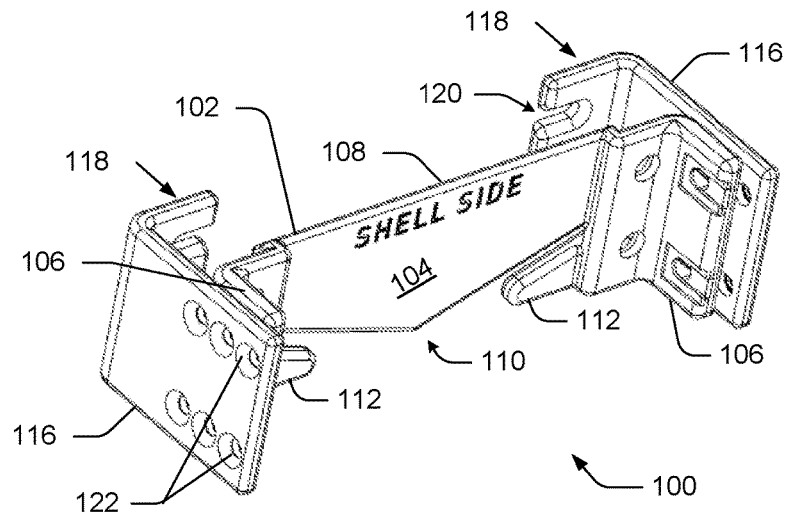
FIGS. 7A and 7B show two views of an example holster dock, according to another implementation.
Figure 7B:
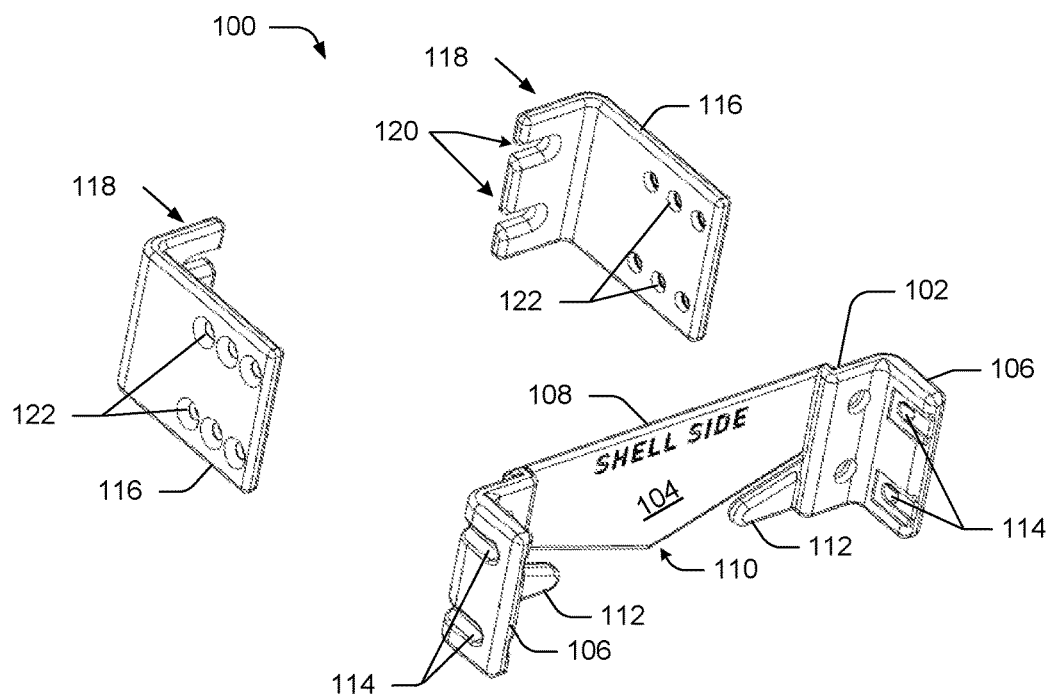

FIGS. 5A-6B show an example of mounting an implement holster to the dock 100, in a first configuration. FIGS. 5A and 6A show aligning the holster to the dock 100, so that the paddle clips onto the mount portion 104 and the body of the holster fits within the space between the mount portion 104 and the surface mount portions 118 of the hard mount bases 116. FIGS. 5B and 6B show the holster mounted to the dock 100. As shown, the paddle may be slid down over the beveled entry edge 108 for ease of mounting. As also shown, once mounted, the paddle may be held in place securely by the shape of the figured paddle grip portion 110, including the grip features 112.

For example, in an embodiment, the one or more grip features 112 comprise one or more finger components 112 and one or more slots 502, wherein the one or more finger components 112 are arranged to deform toward the one or more slots 502 to apply tension to a portion of the paddle or the clip, to hold the paddle or the clip when an implement or an implement holster is mounted to the hard mount component 102. The slight deflection of the finger components 112 into the slots 502 creates a spring-like tension that presses against the paddle to hold it in place. When removing the holster paddle, the finger components 112 release their tension and return to their original shape and location.

Figure 8A:
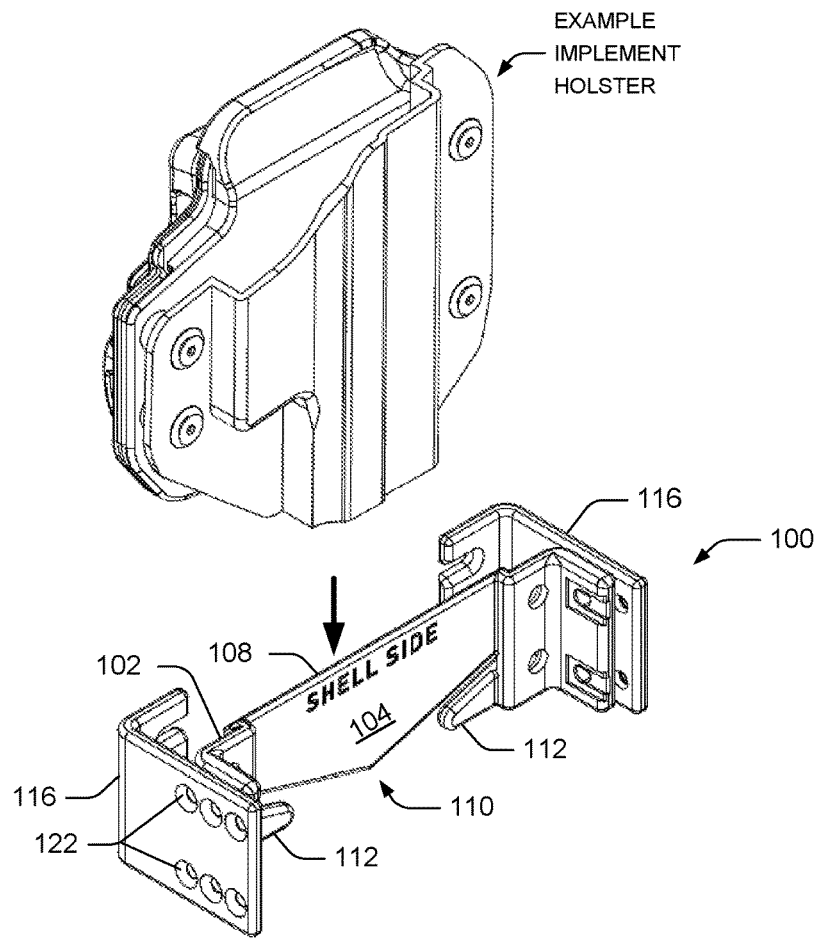
FIGS. 8A and 8B include two front views of an example holster dock in the second configuration, showing an example holster mounted to the dock.

FIGS. 8A-9B show an example of mounting an implement holster to the dock 100, in a second configuration. FIGS. 8A and 9A show aligning the holster to the dock 100, so that the paddle clips onto the mount portion 104 and the body of the holster fits within the space between the mount portion 104 and the ends the hard mount bases 116. Since the dock 100 is coupled to a surface from the paddle side in the second configuration, the holster body may extend past the ends of the hard mount bases 116 if needed. For instance, the second configuration can provide extra room for the holster body, if needed.

Figure 8B:
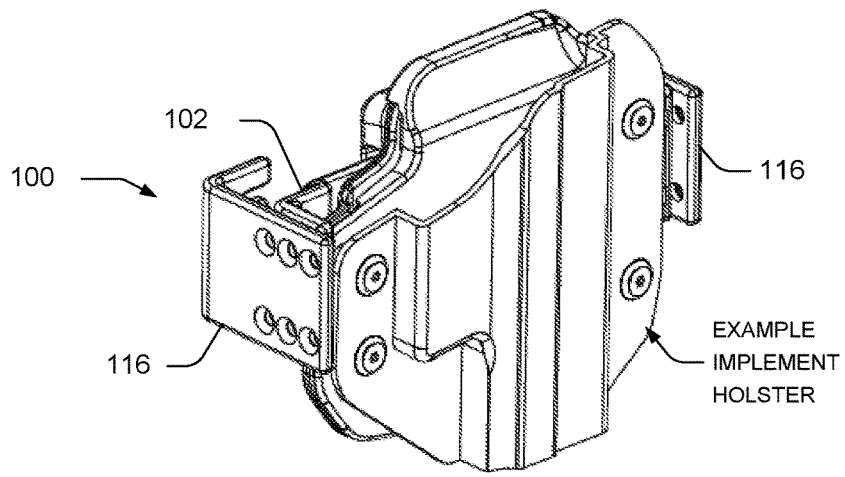
Figure 9A:
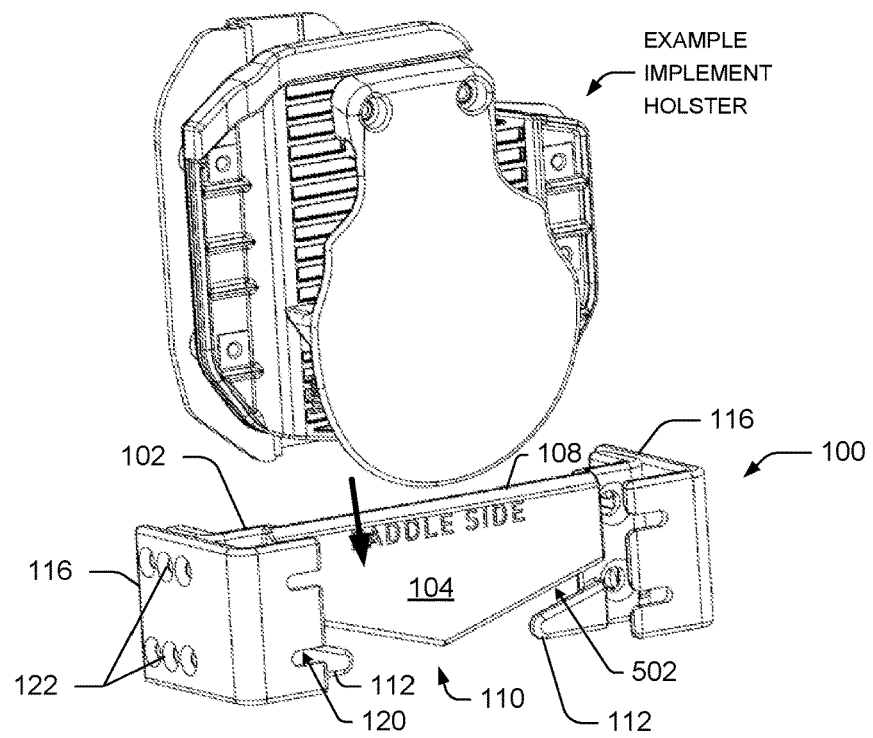
FIGS. 9A and 9B include two back views of an example holster dock in the second configuration, showing an example holster mounted to the dock.
Figure 9B:
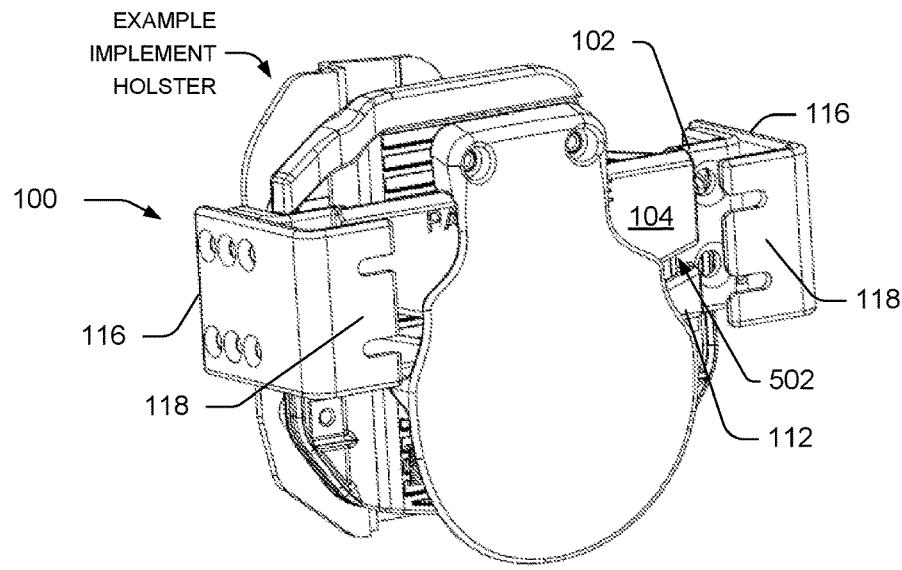
Figure 10A:
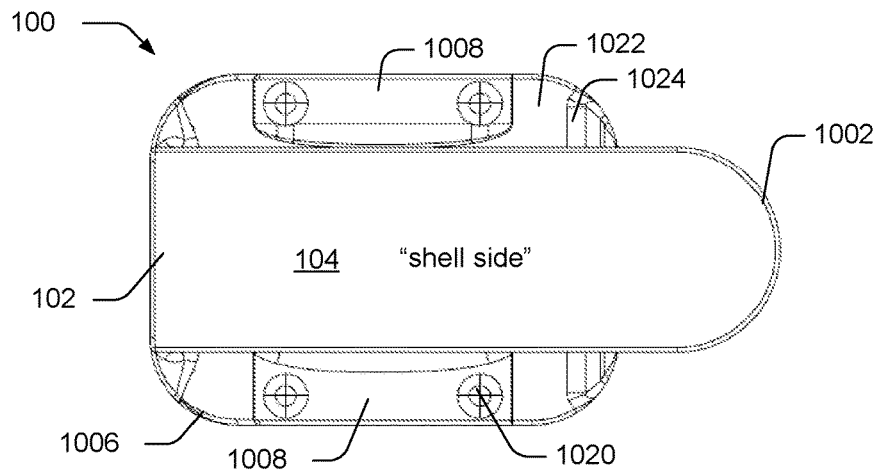
FIGS. 10A-10C include three views of an example holster dock, according to another implementation.
Figure 10B:
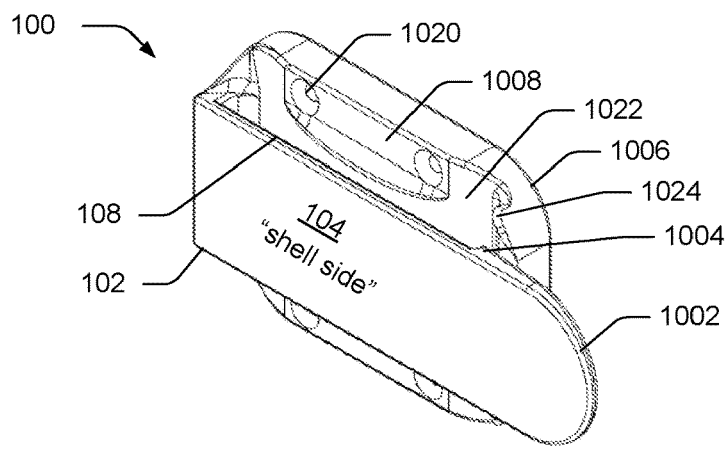
Figure 10C:
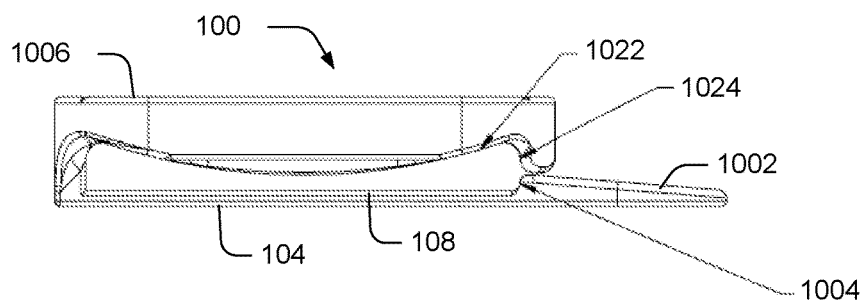

FIGS. 8B and 9B show the holster mounted to the dock 100. As shown, the paddle may be slid down over the beveled entry edge 108 for ease of mounting. As also shown, once mounted, the paddle may be held in place securely by the shape of the figured paddle grip portion 110, including the grip features 112.

Another example dock 100, as shown in FIGS. 10A-11C, includes a hard mount component 102 arranged to receive and to support an implement or an implement holster. The hard mount component 102 includes a substantially planar mount portion 104 configured to receive the implement or the implement holster, including a wedge-shaped insert portion 1002, which allows a belt slide (for example) to be inserted onto the hard mount component 102. The insert portion 1002 includes a mount lip 1004 (i.e., "retention portion") to help keep the implement or the implement holster coupled to the hard mount component 102 until intentionally removed. For example, the mount lip 1004 can block the implement or the implement holster from sliding off the substantially planar mount portion 104.

Figure 11A:
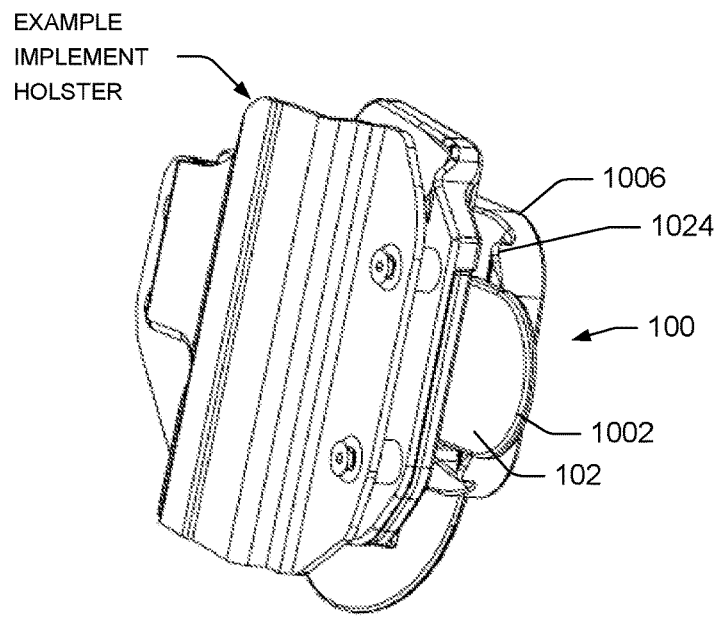
FIGS. 11A-11C include three views of the example holster dock of FIGS. 10A-10C, showing an example holster mounted to the dock.
Figures 11B, 11C:
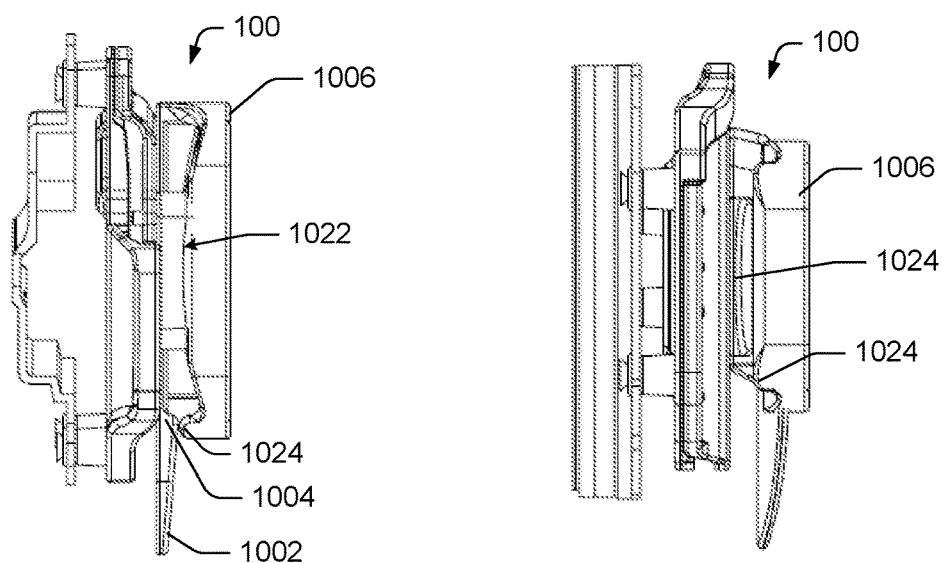

In an implementation, the mount portion 104 has two substantially planar surfaces ("shell side" and "paddle side") and a plurality of side edges (e.g., edges), including a beveled entry edge 108. In one example, a paddle-type holster can be mounted to the hard mount component 102 by sliding the paddle portion over the beveled entry edge 108. FIGS. 11A-11C illustrate a paddle-type holster mounted to an example dock 100.

The dock 100 also includes a hard mount base 1006 to couple the hard mount component 102 to a desired surface. For instance, the base 1006 includes a surface mount portion 1008 having one or more surface mount openings 1020 for temporarily or permanently coupling the mounting dock 100 to the desired surface (e.g., a vehicle console, a desk, a bed, etc.) using permanent or temporary fasteners as desired.

In an implementation, the base 1006 also includes a conforming surface 1022 and a base lip 1024, or like features. For example, the conforming surface 1022 can be shaped to conform to the features, shape, attachment components, or the like, of the implement or the implement holster, to improve retention of the implement or the implement holster. The conforming surface 1022 can be curved to conform to the curved shape of a paddle, in the case of a paddle holster, for instance. The conforming surface 1022 can also be shaped to conform to other attachment components, as desired. (In some embodiments, a belt slide can also fit while the conforming surface 1022 is shaped to conform to a paddle.) A base lip 1024 may be disposed on one or both sides of the conforming surface 1022, and helps to lock a paddle (or the like) to the dock 100. The base lip 1024 is shaped to help prevent the paddle from moving with respect to the dock 100.

In various implementations, the dock 100 is comprised of various plastics, composites, metals, combinations of the same, or the like. For example, the dock 100 may be comprised of a polyamide, or similar material. The use of a molded polyamide or fiber-filled polyimide provides a dock 100 that is rigid and stable for drawing and re-holstering the implement while mounted in the dock 100, for instance. In various embodiments, the dock 100 has stability properties based on a particular material selected for the dock 100. For example, some materials that may be used include nylons, aramids, styrenic block copolymers (TPE-s), polyolefin blends (TPE-o), elastomeric alloys (TPE-v or TPV), thermoplastic polyurethanes (TPU), thermoplastic co-polyesters, thermoplastic polyamides, combinations of the same, and the like. Additionally, in some embodiments, the stability properties are also based on a thickness of the dock 100.

The techniques, components, and devices described herein with respect to the implementations are not limited to the illustrations of FIGS. 1A-11C, and may be applied to other docks, holster devices, and case designs, without departing from the scope of the disclosure. In some cases, additional or alternative components, techniques, sequences, or processes may be used to implement the techniques described herein. Further, the components and/or techniques may be arranged and/or combined in various combinations, while resulting in similar or approximately identical results. It is to be understood that a dock 100 may be implemented as a stand-alone device or as part of another system (e.g., integrated with other components). In various implementations, additional or alternative components may be used to accomplish the disclosed techniques and arrangements.

Although various implementations and examples are discussed herein, further implementations and examples may be possible by combining the features and elements of individual implementations and examples.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the claims.

What is claimed is:
1. A mounting dock, comprising:
   a hard mount component arranged to receive and to support an implement or an implement holster, including a substantially planar mount portion having two substantially planar surfaces opposite to each other and a plurality of side edges, the substantially planar mount portion including an entry edge on a first side edge and a figured grip portion on a second side edge the grip portion comprising one or more grip features arranged to grip a paddle or a clip of the implement or of the implement holster, the one or more grip features comprising one or more finger components and one or more slots, wherein the one or more finger components are arranged to deform with respect to the one or more slots to apply tension to a portion of the paddle or the clip to hold the paddle or the clip when an implement or an implement holster is mounted to the hard mount component; and at least one hard mount base coupled to the hard mount component and configured to temporarily or permanently couple the hard mount component to a selected surface.

2. The mounting dock of claim 1, further comprising at least one mounting ear coupled to or integral to a side edge of the mount portion, the at least one mounting ear having one or more mounting holes for coupling the at least one hard mount base to the hard mount component.

3. The mounting dock of claim 1, further comprising a first mounting ear coupled to or integral to a third side edge of the substantially planar mount portion and a second mounting ear coupled to or integral to a fourth side edge of the substantially planar mount portion, the first and second mounting ears each having one or more mounting holes for coupling a hard mount base to the hard mount component in a plurality of configurations.

4. The mounting dock of claim 3, wherein the at least one hard mount base comprises a first hard mount base configured to be coupled to the hard mount component in an inward or an outward orientation via either of the first and second mounting ears and a second hard mount base configured to be coupled to the hard mount component in an inward or an outward orientation via either of the first and second mounting ears.

5. The mounting dock of claim 4, wherein each of the first and second hard mount bases includes a surface mount portion, and wherein each of the first and second hard mount bases is configured to be removably coupled to the hard mount component in a first configuration with the surface mount portion facing one of the two substantially planar surfaces of the substantially planar mount portion and in a second configuration with the surface mount portion facing another of the two substantially planar surfaces of the substantially planar mount portion.

6. The mounting dock of claim 5, wherein each of the first and second hard mount bases includes a plurality of adjustment holes, and wherein a distance from the surface mount portion of the first and second hard mount bases to the substantially planar mount portion is user-adjustable based on coupling the first and second hard mount bases to the hard mount component via one or more of the plurality of adjustment holes.

7. The mounting dock of claim 1, wherein the at least one hard mount base includes:

a surface mount portion having one or more surface mount openings for temporarily or permanently coupling the mounting dock to the selected surface; and a plurality of adjustment holes disposed at a plurality of adjustment locations for adjusting a distance of the surface mount portion to the hard mount component.

8. The mounting dock of claim 7, wherein the mounting dock is user-adjustable into a first configuration wherein the hard mount component is coupled to the at least one hard mount base with one of the two substantially planar surfaces of the substantially planar mount portion facing the surface mount portion or into a second configuration wherein the hard mount component is coupled to the at least one hard mount base with the one of the two substantially planar surfaces of the substantially planar mount portion facing away from the surface mount portion.

9. The mounting dock of claim 7, wherein a distance from the substantially planar mount portion to the surface mount portions is adjustable based on selecting one or more of the plurality of adjustment holes for coupling the hard mount component to the at least one hard mount base.

10. The mounting dock of claim 1, wherein the entry edge on the first side edge of the substantially planar mount portion is beveled.

11. The mounting dock of claim 1, wherein the figured grip portion is configured to grip and retain the implement holster while the implement holster is mounted to the hard mount component and while an implement is being withdrawn from the implement holster.

12. The mounting dock of claim 1, wherein the implement comprises a firearm and wherein the implement holster comprises a firearm holster.

13. A mounting dock, comprising:
a hard mount component arranged to receive and to support an implement or an implement holster, including a substantially planar mount portion configured to receive the implement or the implement holster, the mount portion having two substantially planar surfaces opposite to each other and a plurality of side edges with a beveled entry edge on a first side edge and a retention portion on a second side edge the retention portion comprising one or more grip features arranged to grip a paddle, a slide, or a clip of the implement or of the implement holster, the one or more grip features comprising one or more finger components and one or more slots, wherein the one or more finger components are arranged to deform with respect to the one or more slots to apply tension to a portion of the paddle, the slide, or the clip in order to press the paddle, the slide, or the clip towards and against the mount portion when an implement or an implement holster is mounted to the hard mount component; and at least one hard mount base coupled to the hard mount component, including a surface mount portion having one or more surface mount openings, for temporarily or permanently coupling the mounting dock to a selected surface.

14. A mounting dock, comprising:
a hard mount component arranged to receive and to support a handgun or a handgun holster, including:
a substantially planar mount portion having two substantially planar surfaces opposite to each other and a plurality of side edges, with a beveled entry edge on a first side edge and a figured grip portion on a second side edge opposite the first side edge, the grip portion comprising one or more grip features arranged to grip a paddle or a clip of the handgun or of the handgun holster, the one or more grip features comprising one or more finger components and one or more slots, wherein the one or more finger components are arranged to deform with respect to the one or more slots to apply tension to a portion of the paddle or the clip to hold the paddle or the clip when an implement or an implement holster is mounted to the hard mount component, and
a first mounting ear coupled to or integral to a third side edge of the mount portion and a second mounting ear coupled to or integral to a fourth side edge of the mount portion, the first and second mounting ears each having one or more mounting holes; and a first hard mount base arranged to be coupled to the hard mount component via one of the first and second mounting ears; and a second hard mount base arranged to be coupled to the hard mount component via the other of the first and second mounting ears, each of the first and second hard mount bases including:

a surface mount portion having one or more surface mount openings for temporarily or permanently coupling the mounting dock to a desired surface; and a plurality of adjustment holes disposed at a plurality of adjustment locations for coupling the first and second hard mount bases to the hard mount component in a plurality of desired configurations and for adjusting a distance of the surface mount portion from the substantially planar mount portion.

15. The mounting dock of claim 14, wherein the mounting dock is configured to be mounted to a wall, to an item of furniture, or to a portion of a vehicle.

\* \* \* \* \*